Dec. 3, 1957 T. E. FIDDLER 2,815,059
NUT AND LOCK WASHER ASSEMBLY WITH STRUT MEANS TO
PREVENT COMPLETE COLLAPSING
OF THE WASHER TEETH
Original Filed Aug. 20, 1949
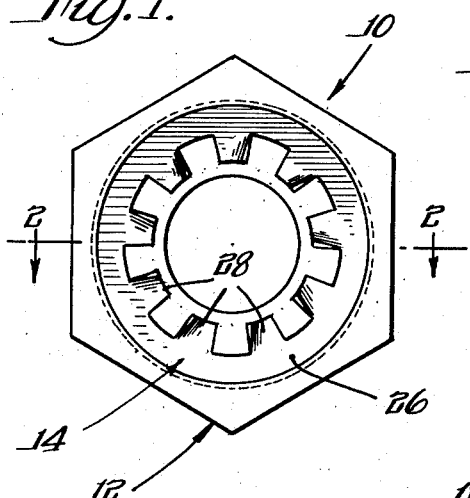
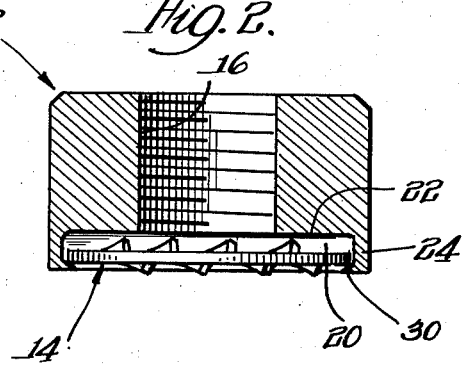
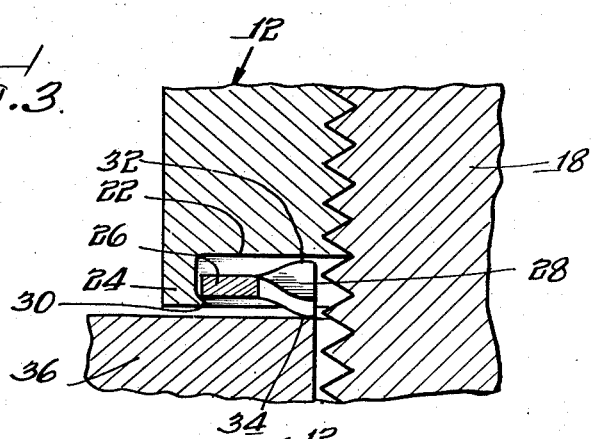
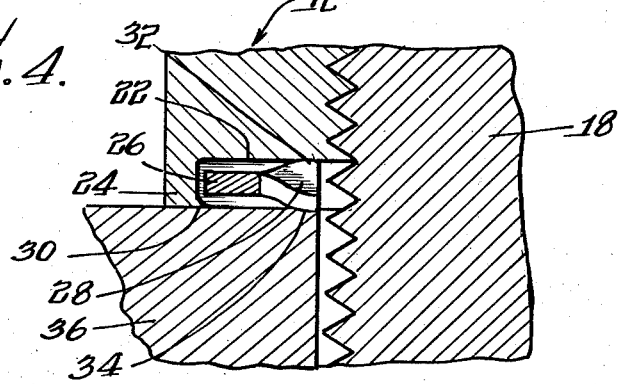
INVENTOR.
Theodore E. Fiddler
BY
Olson & Trexler
Attys.

United States Patent Office 2,815,059
Patented Dec. 3, 1957

2,815,059

NUT AND LOCK WASHER ASSEMBLY WITH STRUT MEANS TO PREVENT COMPLETE COLLAPSING OF THE WASHER TEETH

Theodore E. Fiddler, Rockford, Ill., assignor to Illinois Tool Works, Chicago, Ill., a corporation of Illinois Original application August 20, 1949, Serial No. 111,465. Divided and this application June 3, 1954, Serial No. 434,254

1 Claim. (Cl. 151—37)

The present invention relates to a novel preassembled rotary fastener and lock washer unit and will be described with particular reference to an assembly including a nut and a twisted tooth-type lock washer. The present application is a division of my copending application S. N. 111,465, filed August 20, 1949, and now abandoned.

An important object of the present invention is to provide a novel threaded rotary fastener or nut and lock washer assembly wherein the lock washer is permanently retained in assembled relationship with the nut and is free to swivel or rotate relative to the nut.

Another object of the present invention is to provide a novel rotary fastener or nut and tooth lock washer assembly which is constructed in a simple and economical manner to retain the lock washer in assembled relationship with the nut and to prevent complete collapsing of the lock washer teeth upon application of the assembly to the work.

Other objects and advantages of the present invention will become apparent from the following description and accompanying drawings wherein:

Fig. 1 is a bottom view of a novel nut and lock washer assembly embodying the principles of this invention;

Fig. 2 is a cross sectional view taken along line 2—2 in Fig. 1;

Fig. 3 is an enlarged fragmentary cross sectional view similar to Fig. 2 and further showing the relationship between the lock washer and the nut upon the initial application of the assembly to a work piece; and Fig. 4 is an enlarged fragmentary cross sectional view similar to Fig. 3 and further showing the relationship between the parts after the assembly has been fully applied to a work piece.

Referring now more specifically to the drawings wherein like parts are designated by the same numerals throughout the various figures, a preassembled unit 10 embodying the principles of this invention includes a threaded rotary fastener or nut 12 and a lock washer 14.

The nut 12 may be provided with any well known external configuration such as the hexagonal shape shown. The nut body has a threaded bore 16 formed therein adapted to receive a threaded shank 18 of a complementary stud or screw member. At the inner or clamping end of the nut body an enlarged counterbore 20 is formed to provide the nut body with an internal clamping surface 22 extending radially from the threaded bore and a peripheral flange 24 extending axially from the clamping surface.

The lock washer 14 is formed from sheet material, which is preferably resilient sheet metal, and includes a flat annular body portion 26 and a plurality of teeth or prongs 28 extending radially inwardly from the inner margin of the annular body portion. The washer 14 is disposed within the counterbore 20 so that the annular body portion 26 is enclosed by the peripheral flange 24 of the nut member and as shown best in Figs. 2, 3 and 4, the free end of the peripheral flange 24 is swaged or otherwise formed inwardly as indicated at 30 to engage beneath the annular body portion of the washer and retain the washer in assembled relationship with the nut. Each of the prongs 28 is twisted about its radial axis so as to present tooth edges 32 and 34 respectively for engagement with the clamping surface 22 of the nut and the surface of the work piece 36 as shown best in Figs. 3 and 4.

It should be noted that the outer diameter of the annular washer body portion 26 is slightly less than the diameter of the bore 20 or the internal diameter of the peripheral flange 24 with the exception of the inwardly formed annular protuberance means 30 and that the axial distance between planes coincident with the tooth edges 32 and the bottom surface of the annular body portion 26 is less than the axial distance between the clamping surface 22 and the protuberance means 30 so that the washer is loosely retained within the bore 20 and is free to swivel or rotate relative to the nut during the application of the assembly to the work piece. Thus, the flange or protuberance 30 is spaced from the clamping side 22 of the nut a distance which is at least as great as the distance between the axially inner edges of the deflected teeth and the axially outer surface of the washer body. It should also be noted that the axial distance between planes coincident with the tooth edges 32 and the tooth edges 34 is greater than the axial extent of the peripheral flange 24 so that the edges 34 extend from the bore 20 for engagement with the work piece as shown in Figs. 3 and 4. However, the axial extent of the peripheral flange 24 is sufficient so that the free end thereof provides an abutment engageable with the work piece positively to limit the degree to which the assembly may be tightened against the work piece and thereby positively limiting the amount which the prongs 28 may be flattened whereby maximum locking effectiveness of the prongs is assured. It will be appreciated that the assembly of this invention may be repeatedly tightened substantially the same amount against the work piece since the peripheral flange 24 is extremely rugged and substantially undeformable, which ruggedness is promoted by the relatively great amount of material or the relatively large radial cross section of the flange at the corners of the nut.

From the above description it is seen that the present invention has provided a novel rotary fastener and lock washer assembly which is of simple and economical construction and which is highly efficient in operation. More specifically, it is seen that the present invention has provided a nut and twisted tooth lock washer assembly with simple and rugged means for not only retaining the washer in assembled relationship with the nut but also for positively preventing undue flattening of the washer teeth during application of the assembly to a work piece.

While the preferred embodiment of the present invention has been shown and described herein it is obvious that many structural details may be changed without departing from the spirit and scope of the appended claim.

The invention is claimed as follows:

A pre-assembled nut and lock washer unit including a washer member having an outer annular relatively flat sheet metal body and circumferentially spaced teeth extending inwardly from the inner margin of said body and having axially deflected portions spaced entirely around the body and extending beyond opposite sides of said body, and a nut member having a counterbore on the clamping side thereof receiving the washer and defined by a relatively thick peripheral wall projecting from the clamping side of the nut member a distance less than the distance between the outer edges of the oppositely deflected teeth to permit effective locking action of the teeth in clamped position and terminating in a flat bearing edge, and said peripheral wall being of sufficient radial thickness throughout its axial extent and including the free bearing edge thereof to provide a substantially non-deformable strut preventing complete collapsing of the teeth in clamped position, said peripheral wall having a substantially uniform internal diameter throughout its axial extent to provide for free axial floating movement of the annular washer body during clamping movement, and flange means extending inwardly of said peripheral wall for trapping the annular body within the counterbore to prevent inadvertent axial separation therefrom and disposed adjacent but not axially beyond the plane of the bearing edge of the peripheral wall whereby the said flange means is protected against axial deformation tending to crowd the washer body by the substantially non-deformable strut provided by said peripheral wall, said flange means being spaced from the clamping side of the nut a distance at least as great as the distance between the axially inner edges of the deflected teeth and the axially outer surface of the washer body and terminating adjacent and beneath the outer margin of the washer body whereby to leave the washer body and particularly the inner margin thereof and the connected roots of the teeth completely unencumbered and free for flexing incident to twisting of the teeth under clamping pressure.

References Cited in the file of this patent

UNITED STATES PATENTS

| | | |
|---|---|---|
| 1,611,210 | Liddell | Dec. 21, 1926 |
| 1,963,800 | Olson | June 19, 1934 |
| 2,424,208 | Poupitch | July 15, 1947 |

FOREIGN PATENTS

| | | |
|---|---|---|
| 331,682 | Great Britain | July 10, 1930 |